(12) United States Patent
Kim et al.

(10) Patent No.: US 8,445,152 B2
(45) Date of Patent: May 21, 2013

(54) MEMBRANE ELECTRODE ASSEMBLY CONTAINING FLEXIBLE PRINTED CIRCUIT BOARD FORMED ON ION EXCHANGE MEMBRANE SUPPORT FILM

(75) Inventors: Sae Hoon Kim, Gyeonggi-do (KR); Yong Hyun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 687 days.

(21) Appl. No.: 11/986,842

(22) Filed: Nov. 27, 2007

(65) Prior Publication Data
US 2008/0318101 A1    Dec. 25, 2008

(30) Foreign Application Priority Data
Jun. 19, 2007   (KR) ................. 10-2007-0059866

(51) Int. Cl.
   *H01M 2/02*   (2006.01)
   *H01M 2/08*   (2006.01)
   *H01M 8/04*   (2006.01)
   *H01M 8/24*   (2006.01)

(52) U.S. Cl.
   USPC ........... 429/432; 429/428; 429/430; 429/433; 429/442; 429/463

(58) Field of Classification Search
   USPC ............. 429/26, 422, 428, 430, 432, 433, 429/442, 463
   See application file for complete search history.

(56) References Cited

U.S. PATENT DOCUMENTS

| | | | |
|---|---|---|---|
| 6,821,658 B2 | 11/2004 | Acker et al. | |
| 2003/0129461 A1 | 7/2003 | Bruck et al. | |
| 2003/0215678 A1* | 11/2003 | Barton et al. | ............ 429/12 |
| 2004/0131907 A1* | 7/2004 | Arita et al. | ............ 429/30 |

FOREIGN PATENT DOCUMENTS

| | | | |
|---|---|---|---|
| JP | 2005093282 A | * | 4/2005 |
| JP | 2005-340166 | | 12/2005 |
| JP | 2006-079850 | | 3/2006 |
| JP | 2006-156077 | | 6/2006 |
| JP | 2006-179233 | | 7/2006 |
| KR | 10-2006-0012155 A | | 2/2006 |

OTHER PUBLICATIONS

Kobayashi et al., Machine translation of JP 2005093282 A, Apr. 2005.*

* cited by examiner

*Primary Examiner* — Basia Ridley
*Assistant Examiner* — Sean P Cullen
(74) *Attorney, Agent, or Firm* — Edwards Wildman Palmer LLP; Peter F. Corless (57) ABSTRACT

Disclosed is an MEA in which a catalyst layer is coated on both sides of an ion exchange membrane. An ion exchange membrane support film is attached on both sides of an edge portion of the ion exchange membrane, and a PCB is mounted on one surface of the ion exchange membrane support film along an outer line of the catalyst layer of the MEA. Furthermore, a PCB terminal is formed on one end of the PCB, and a connector is connected to the PCB terminal to communicate with an external controller. The PCB includes a heating element, a first temperature sensor measuring the temperature of the heating element, a second temperature sensor measuring the temperature of the MEA, a first contact measuring the resistance of unit cells, and a second contact measuring the voltage of the unit cells, formed in a predetermined arrangement to communicate with the PCB terminal.

11 Claims, 12 Drawing Sheets

Fig. 1

PRIOR ART

Fig. 2

PRIOR ART

Fig. 3

PRIOR ART

Fig. 4

PRIOR ART

MEMBRANE ELECTRODE ASSEMBLY CONTAINING FLEXIBLE PRINTED CIRCUIT BOARD FORMED ON ION EXCHANGE MEMBRANE SUPPORT FILM

CROSS-REFERENCE TO RELATED APPLICATION

This application claims under 35 U.S.C. §119(a) on Korean Patent Application No. 10-2007-0059866, filed on Jun. 19, 2007, the entire contents of which are incorporated herein by reference.

BACKGROUND (a) Technical Field

The present invention relates to an intelligent membrane electrode assembly (MEA) for fuel cell. More particularly, the present invention relates to an intelligent MEA for fuel cell that can easily measure the voltage of unit cells and prevent heat transfer from an outside low-temperature heat source to a catalyst layer of the MEA during preservation and operation of the fuel cell stack at low temperature.

(b) Background Art

A fuel cell stack, which is a main power source of a fuel cell vehicle, is a device that generates electricity by an electrochemical reaction between oxygen in the air and hydrogen supplied from fuel. The fuel cell stack applied to a vehicle is composed of several hundred unit cells, and each unit cell generates a voltage of about 0.6 V to 1.0 V.

Figure 1:
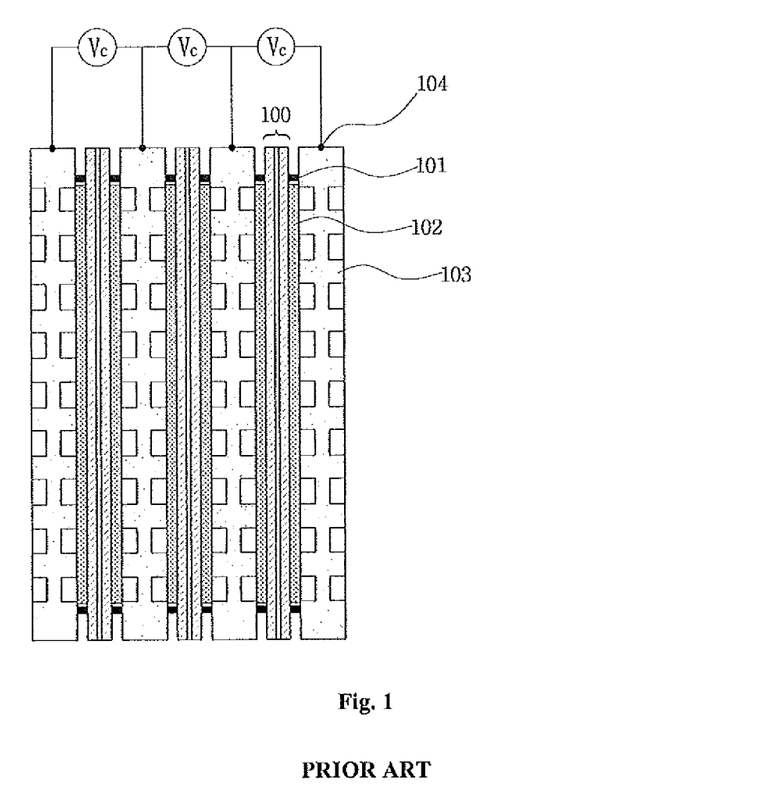
FIG. 1 is a schematic diagram illustrating a conventional fuel cell stack composed of three unit cells.

FIG. 1 is a schematic diagram illustrating a conventional fuel cell stack composed of three unit cells.

As shown in the figure, the unit cell includes a membrane electrode assembly (MEA) 100, a gas diffusion layer (GDL) 102, a separator 103, and a gasket 101 for an airtight seal.

In general, the voltage of the unit cell is monitored through an electrical contact 104 formed on the separator 103 as a measurement terminal in order to check the state of the corresponding unit cell during the operation of the fuel cell stack.

Such a cell voltage monitor system (CVMS) includes a measurement terminal for forming the electrical contact 104 with the separator 103 and a control unit for measuring the voltage.

As mentioned above, since the fuel cell stack for vehicle is composed of several hundred unit cells, it takes a lot of time to form a voltage terminal in each unit cell after assembling the stack, which is considered as a problem that affects the production rate in mass production of the fuel cell stack.

Figure 3:
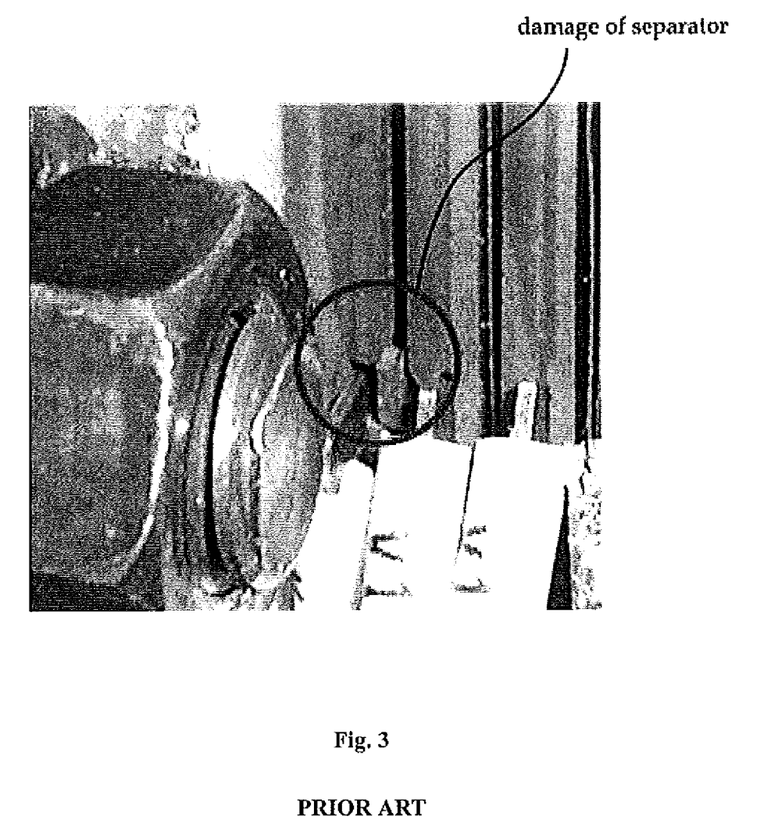
FIGS. 3 and 4 are photographs showing a conventional separator damaged by vibration and impact generated during vehicle driving, taken when measuring the voltage of the unit cells.
Figure 4:
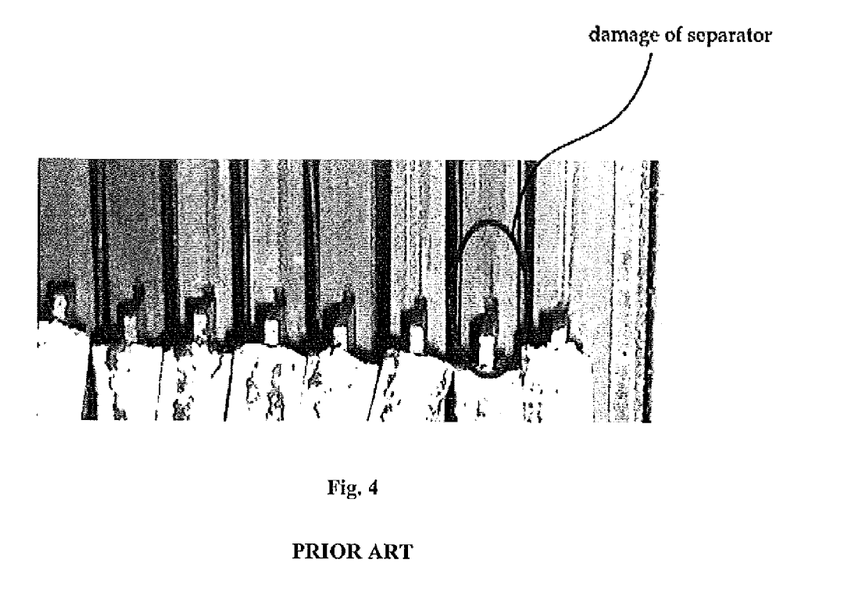

According to a prior art technology, a plurality of grooves are is formed on the later surface of the separator 103, and a plurality of electrically conductive terminals acting as measurement terminals are sequentially inserted in the grooves. However, such a structure has some drawbacks in that the separators may be damaged by vibration and impact generated during vehicle driving as shown in the photographs of FIGS. 3 and 4. Moreover, the contact property with respect to the separator may be deteriorated and the terminals may be separated therefrom. Furthermore, it takes much time to sequentially insert the terminals into the grooves.

In order to overcome such drawbacks, U.S. Pat. No. 6,410,176 and U.S. Patent Application Publication No. 2003/0092292 disclose voltage monitoring systems in which an elestomeric connector is closely adhered to the lateral surface of a separator. Moreover, U.S. Patent Application Publication No. 2002/0090540 discloses an electrical contacting device for an electrochemical fuel cell, in which electrical contacts are formed on a printed circuit board (PCB) and the PCB is attached to the lateral surface of a separator. Besides, a method of monitoring the voltage using an electrical contact terminal to which an elastic force is added using a spring is known in the art.

However, the above-described prior art technologies have some common problems in that, as the interval of the separators is irregular, in case of a fuel cell stack composed of a small number of unit cells, it is possible to design a connector having elastic contact terminals arranged in series in view of manufacturing tolerance of the fuel cell stack and mount the thus designed connector to a separator; however, in case of a fuel cell stack composed of at least 200 unit cells, it is very difficult to design the contact terminals due to manufacturing tolerance of the whole length of the stack.

Figure 2:
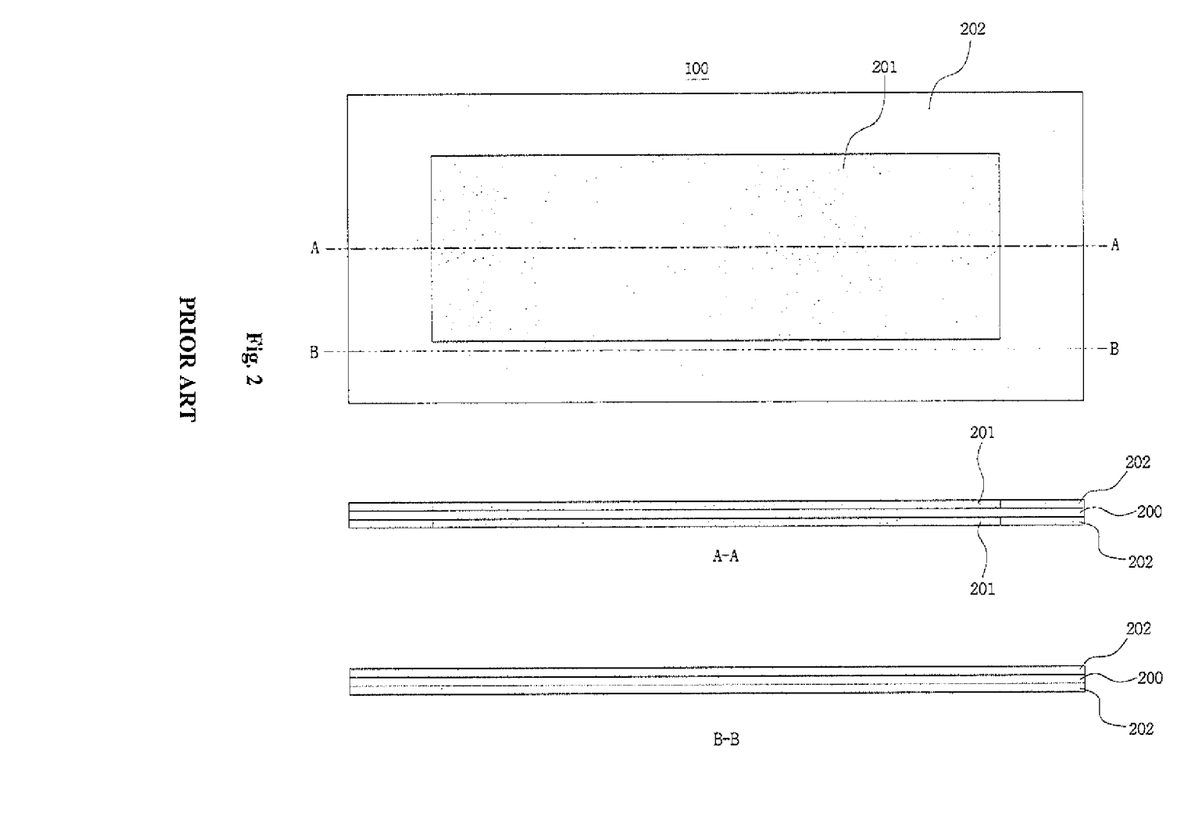
FIG. 2 is a schematic diagram illustrating a conventional membrane electrode assembly (MEA)

FIG. 2 is a schematic diagram illustrating a conventional MEA 100.

As shown in FIG. 2, an MEA 100 has a structure in which a catalyst layer 201 is coated on both sides of an ion exchange membrane 200 (or an electrolyte membrane) capable of transferring hydrogen protons so that hydrogen and oxygen react with each other, and a support film 202 is formed on both sides thereof for the reinforcement of the ion exchange membrane 200 and the convenience of handling.

The key problem to be solved to achieve the mass production of the fuel cell stack is startability at a low temperature below the freezing point.

Under low temperature conditions, if the ion conductivity of the ion exchange membrane 20 is sharply decreased, the performance of the fuel cell stack is deteriorated. Especially, vapor generated by a reaction between hydrogen and oxygen would be frozen on the catalyst layers 201 and thus the reaction would not occur.

Accordingly, starting the fuel cell at a temperature below the freezing point becomes a critical issue in many companies and research institutes related to the fuel cell.

In order to improve the startability at a low temperature of the fuel cell stack, the temperature of the fuel cell stack should be raised to a normal state within a short period of time, and the methods that have been proposed to improve startability include:

1) Installing an electrical heating device in the vicinity of a fuel cell stack connection device or an electrical current collector located on both ends of the fuel cell stack;

2) Wrapping the fuel cell stack with a heat insulating material to prevent heat generated in fuel cells from being transferred to the air and to use the heat to raise the temperature of the stack; and 3) Heating a coolant by electrical energy generated at the initial stage of the operation of the fuel cell stack and supplying the heated coolant to the fuel cell stack.

As described above, in order to start the fuel cell stack at a temperature below the freezing point to be operated in a normal state, the temperature of the stack should be raised to a temperature above the freezing point within a short period of time. However, the amount of energy generated in the fuel cell stack itself, while water, heat and electricity are generated by the reaction between hydrogen and oxygen, is not enough to raise the temperature of the stack above the freezing point.

Especially, the temperature of the fuel cell stack should reach the melting temperature before the reaction water is frozen on the surface of the catalyst layer and the electrochemical reaction thus cannot occur in the fuel cell stack. In order to realize the above-mentioned objective, U.S. Patent Application Publication No. 2006/0240300 discloses a combustion-thawed fuel cell structure in which combustion chambers are located adjacent to the end cells to conductively heat the end cells during cold start-up of a fuel cell stack. U.S.

Patent Application Publication No. 2005/0277003 discloses a fuel cell system that employs a start-up heater coupled to a cold plate that warms a stack coolant during start-up of the system. Moreover, U.S. Pat. No. 6,916,566 discloses a system and method for rapid preheating of an automotive fuel cell, in which compressed air from an air supply compressor is used to heat fuel cells of a fuel cell stack using a heat exchanger.

However, although the above-described prior art methods heat end cells exposed to the cold air to raise the temperature thereof, they cannot raise the temperature of the entire fuel cell stack.

Moreover, the method of heating a coolant by electrical energy generated at the initial stage of the operation of the fuel cell stack or using a heat exchanger requires a lot of time to heat an intermediate material and is inefficient in view of the efficiency of the heat exchanger.

Furthermore, the method of wrapping the fuel cell stack with a heat insulating material is effective to prevent the temperature of the stack from falling after driving at a low temperature and to shorten the time required to raise the temperature of the stack above the freezing point by preventing heat generated in the stack from being transferred to the air; however, it cannot actively raise the temperature of the stack.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and an object of the present invention is to provide an intelligent membrane electrode assembly (MEA) for fuel cell in which a flexible PCB including an electrical heating element, temperature sensors and electrical contacts is mounted to an MEA, which can easily measure the voltage of the unit cells constituting the fuel cell stack and the resistance and temperature of the MEA and prevent heat transfer from an outside low-temperature heat source to a catalyst layer of the MEA during preservation and operation of the fuel cell stack at low temperature.

In one aspect, the present invention provides an intelligent membrane electrode assembly (MEA) for fuel cell, comprising: an MEA in which a catalyst layer is coated on both sides of an ion exchange membrane, and an ion exchange membrane support film is attached on both sides of an edge portion of the ion exchange membrane; a flexible printed circuit board (PCB) mounted on one surface of the ion exchange membrane support film along the outer line of the catalyst layer of the MEA; a PCB terminal formed on one end of the flexible PCB; and a connector connected to the PCB terminal to communicate with an external controller, wherein the flexible PCB includes an electrical heating element, an electrical heating element temperature sensor for measuring the temperature of the electrical heating element, an MEA temperature sensor for measuring the temperature of the MEA, an electrical contact for measuring the resistance of unit cells, and an electrical contact for measuring the voltage of the unit cells, formed in a predetermined arrangement to communicate with the PCB terminal.

In a preferred embodiment, the flexible PCB is formed of a polymer insulating film of a polyimide material and includes a rectangular frame line attached along the outer line of the catalyst layer of the MEA and an extension portion extending outward from the lower end the rectangular frame line.

Preferably, the electrical heating element is electrically connected to the PCB terminal and attached to the flexible PCB along the rectangular frame line of the flexible PCB and the outer line of the extension portion.

Suitably, the electrical heating element temperature sensor, the MEA temperature sensor, the electrical contact for measuring the resistance of the unit cells, and the electrical contact for measuring the voltage of the unit cells are formed in a row at a position where the extension portion of the flexible PCB starts to extend from the rectangular frame line.

In another preferred embodiment, a branch terminal including an electrical contact for measuring the resistance of the unit cells and an electrical contact for measuring the voltage of the unit cells is integrally formed such that the extension portion is positioned on one surface of the MEA and the branch terminal is positioned on the opposite surface of the MEA.

Preferably, the PCB terminal is formed at a position rotated 90 degrees, i.e., on the side end of the extension portion of the flexible PCB, not on the lower end thereof, such that the connector is slidably connected thereto.

Suitably, a flexible PCB fixing film is provided on the surface of the ion exchange membrane support film so as to cover the flexible PCB in order to reinforce the bonding force between the flexible PCB and the ion exchange membrane support film of the MEA.

More suitably, the flexible PCB is formed to have the same area as the ion exchange membrane support film in order to reinforce the bonding force with the ion exchange membrane support film.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

Reference numerals set forth in the Drawings includes reference to the following elements as further discussed below:

| | |
|---|---|
| 100: | membrane electrode assembly (MEA) |
| 101: | gasket |
| 102: | gas diffusion layer (GDL) |
| 103: | separator |
| 104: | electrical contact |
| 200: | ion exchange membrane |
| 201: | catalyst layer |
| 202: | ion exchange membrane support film |
| 203: | flexible PCB fixing film |
| 300: | polymer insulating film |
| 301: | electrical heating element |
| 302: | electrical heating element temperature sensor |
| 303: | MEA temperature sensor |
| 304 and 304': | electrical contact for measuring resistance |
| 305 and 305': | electrical contact for measuring voltage |
| 306: | PCB terminal |
| 307: | extension portion |
| 308: | branch terminal |
| 309: | side-mounted PCB terminal |
| 400: | flexible PCB |
| 500: | intelligent MEA |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 5:
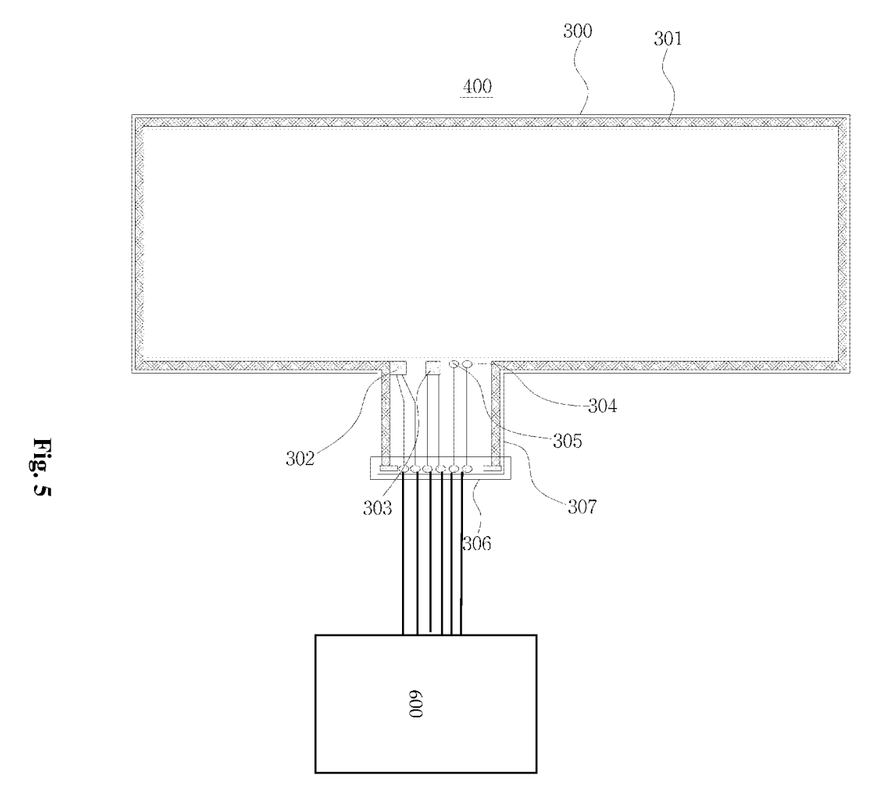
FIG. 5 is a plan view illustrating a flexible PCB for an intelligent MEA in accordance with an exemplary embodiment the present invention.
Figure 6:
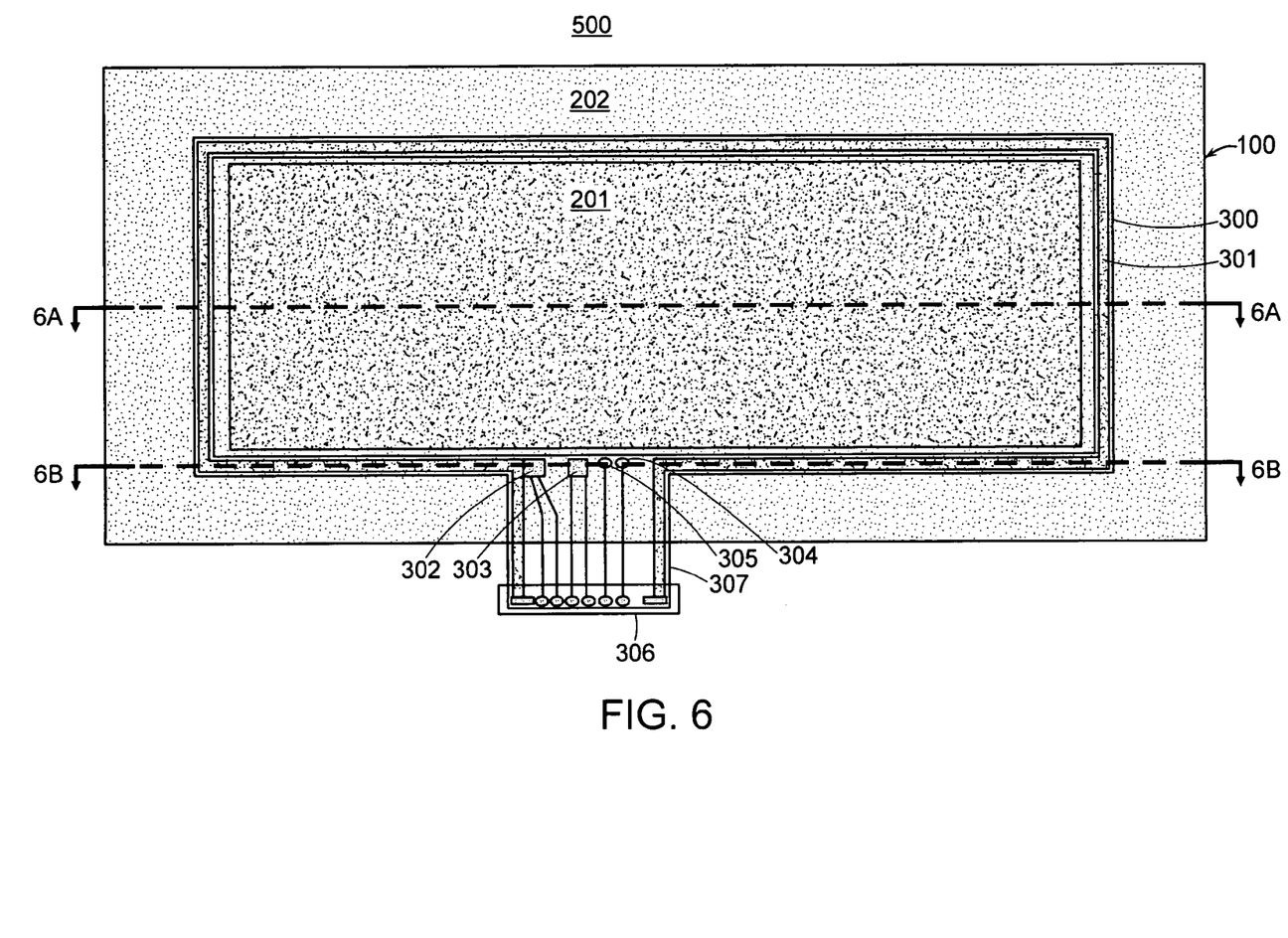
FIG. 6 shows a plan view and a cross-sectional view illustrating an intelligent MEA on which the flexible PCB of FIG. 5 is mounted.
Figure 6A:
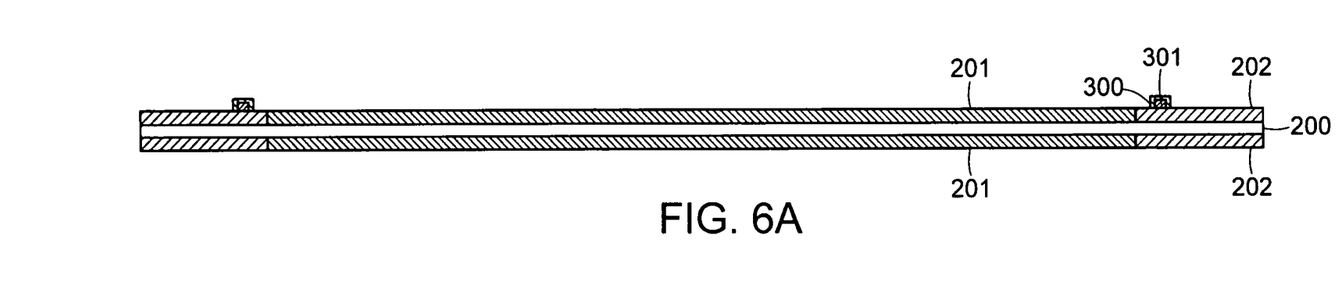
Figure 6B:
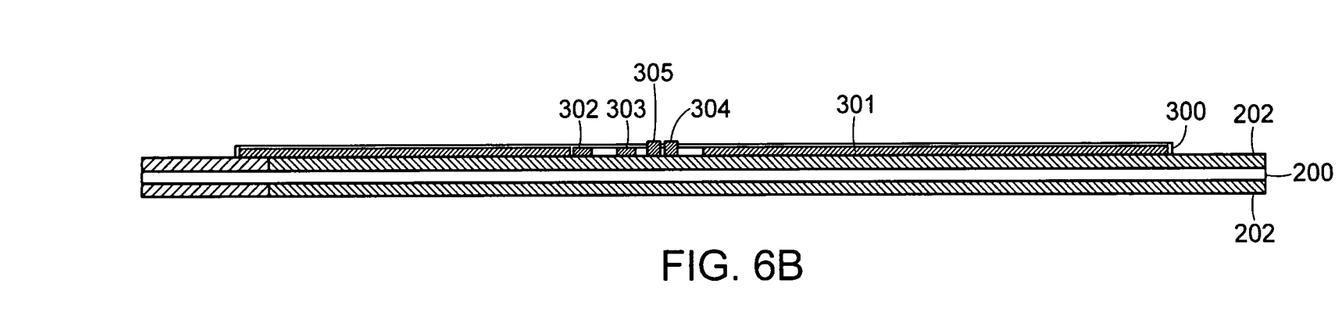

FIG. 5 is a plan view illustrating a flexible PCB for an intelligent MEA in accordance with an exemplary embodiment the present invention, and FIG. 6 is a plan view and a cross-sectional view illustrating an intelligent MEA on which the flexible PCB of FIG. 5 is mounted.

The intelligent MEA in accordance with the present invention includes an ordinary membrane electrode assembly (MEA) 100, in which a catalyst layer 201 is coated on both sides of an ion exchange membrane 200 (or an electrolyte membrane), and a flexible PCB 400 mounted on the MBA 100. Especially, the flexible PCB 400 is characterized in that an electrical heating element 301, an electrical heating element temperature sensor 302, an MEA temperature sensor 303, an electrical contact 304 for measuring resistance, and an electrical contact 305 for measuring voltage are integrally formed.

With the above structure, it is possible to easily measure the voltage of unit cells constituting a fuel cell stack and prevent heat transfer from an outside low-temperature heat source to the catalyst layer 201 of the MEA 100 during operation of the fuel cell stack at low temperature.

The configuration of the flexible PCB 400 will be described in more detail below.

First, a polymer insulating film 300 formed of a polymer insulating material such as polyimide, which becomes a preform of the flexible PCB 400, is prepared in a rectangular frame shape.

An extension portion 307 extending outward to accommodate sensors, electrical contacts and terminals is integrally formed on a lower portion of the polymer insulating film 300.

Moreover, an electrical heating element 301 is attached along the rectangular frame line of the polymer insulating film 300 and the outer line of the extension portion 307.

Furthermore, a PCB terminal 306 connected to communicate with an external controller 600 by a connector is formed on the lower end of the extension portion 307 of the polymer insulating film 300.

In particular, the electrical heating element temperature sensor 302 for measuring the temperature of the electrical heating element 301, the MBA temperature sensor 303 for measuring the temperature of the MEA 100, the electrical contact 304 for measuring the resistance of the unit cells, and the electrical contact 305 for measuring the voltage of the unit cells are formed in a predetermined arrangement to communicate with the PCB terminal 306.

The thus prepared flexible PCB 400 is mounted to the MEA 100 to form an intelligent MEA 500 of the present invention as shown in FIG. 6.

As described above, the MEA 100 has a structure in which the catalyst layer 201 is coated on both sides of the ion exchange membrane 200, and a support film 202 is attached on both sides thereof for the reinforcement of the ion exchange membrane 200 and the convenience of handling. The flexible PCB 400 is mounted to the MEA 100 such that the rectangular frame line of the polymer insulating film 300 is arranged adjacent to the outer line of the catalyst layer 201 of the MEA 100.

Figure 7:
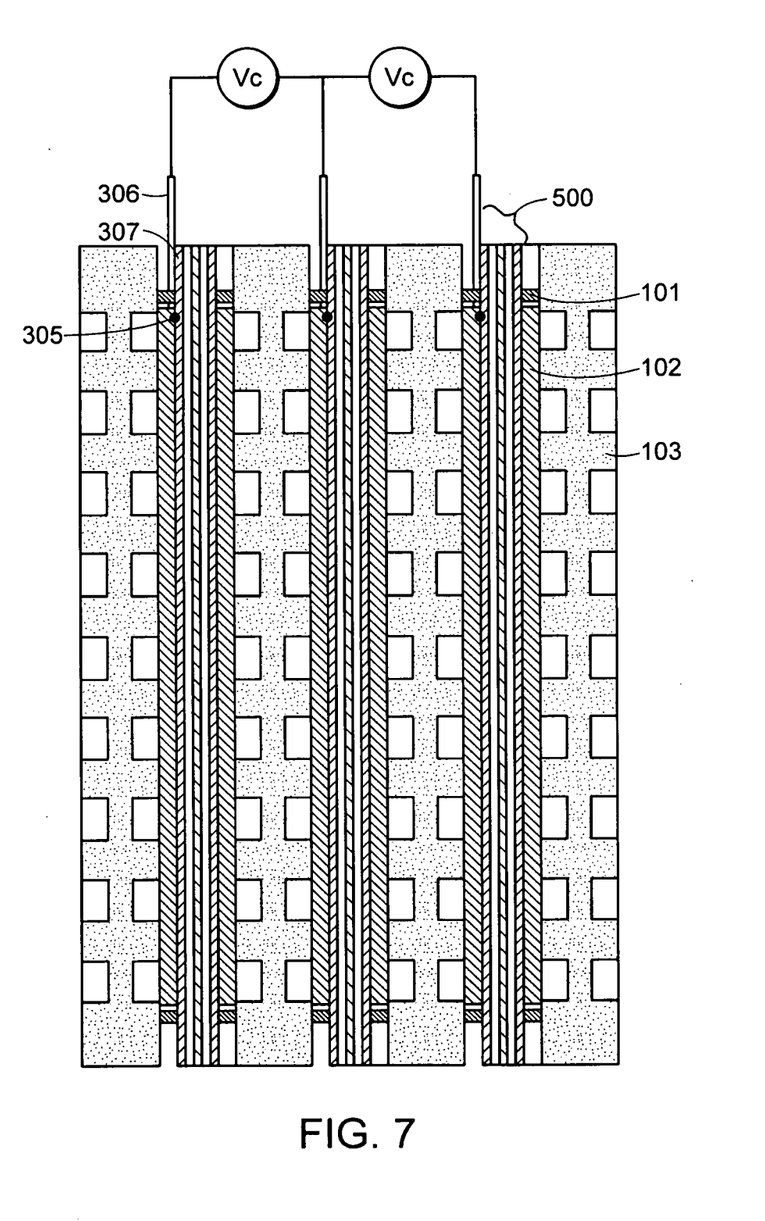
FIG. 7 is a schematic diagram illustrating an example in which the intelligent MEA in accordance with the present invention is formed as a unit cell constituting a fuel cell stack.

As shown in FIG. 7, the intelligent MEA 500 of the present invention configured as described above may include a gas diffusion layer (GDL) 102, a separator 103, a gasket 101 for an airtight seal, and a unit cell constituting the fuel cell stack.

In particular, the GDL 102 is positioned on both sides of the intelligent MEA 500, and the separator 103 is positioned on both sides of the GDL 102. Especially, the extension portion 307 of the polymer insulating film 300 of the flexible PCB 400 constituting the intelligent MEA 500 is exposed to the outside, and the PCB terminal 306 formed on the extension portion 307 is thus exposed to the outside.

Accordingly, even though a separate measurement terminal is not formed on the separator 103, it is possible to readily measure the voltage of the unit cells through the electrical contact 305 for measuring the voltage of the unit cells being in contact with the GDL 102 using the PCB terminal 306.

Moreover, the electrical contact 304 for measuring resistance is used to monitor the degree of degradation of the MEA 100 and the GDL 102, in which the resistance is measured by the external controller 600 to estimate the degree of damage of the MEA 100 and the GDL 102.

As discussed above, according to the present invention, even though the separator 103 is formed of graphite, there is no risk of damage caused by a terminal connection. Moreover, even in a case where the separator 103 is formed of a thin metal plate, there is no necessity of a separate terminal connection by a welding process, for example.

Moreover, when designing a connector in which a plurality of electrical contacts are formed in series, if the interval between the unit cells is varied as the thickness of the separator is varied or as the connection pressure of the fuel cell stack is varied, the connector should be redesigned and further the contacts are likely to be formed unevenly due to manufacturing tolerance. However, since the flexible PCB 400 in accordance with the present invention has a degree of freedom of the layout design for the position of the PCB terminal 306, it may be readily applied even to a fuel cell stack having a large manufacturing tolerance.

Meanwhile, the electrical heating element 301 plays a role in protecting the intelligent MEA 500 from an external low-temperature heat source when starting at a low temperature.

That is, the current amount supplied to the electrical heating element 301 is adjusted by the external controller 600 according to a difference in temperatures detected by the electrical heating element temperature sensor 302 and the MEA temperature sensor 303 and thereby the current amount is controlled to heat the MEA 100 within a temperature range that does not damage the MEA 100.

Accordingly, it is possible to reduce the amount of the heat insulating material used to protect the fuel cell stack from the external low-temperature heat source. Moreover, since the MEA 100 is directly heated by the electrical heating element 301, the efficiency is improved compared with the conventional method in which the electrical energy of the stack is converted into thermal energy and the stack is reheated by the thermal energy. Furthermore, it is possible to use the residual power of the stack, after being consumed by the electrical heating element 301, to heat a coolant.

Another embodiment of the PCB terminal formed on the flexible PCB of the present invention will be described below.

Figure 8A:
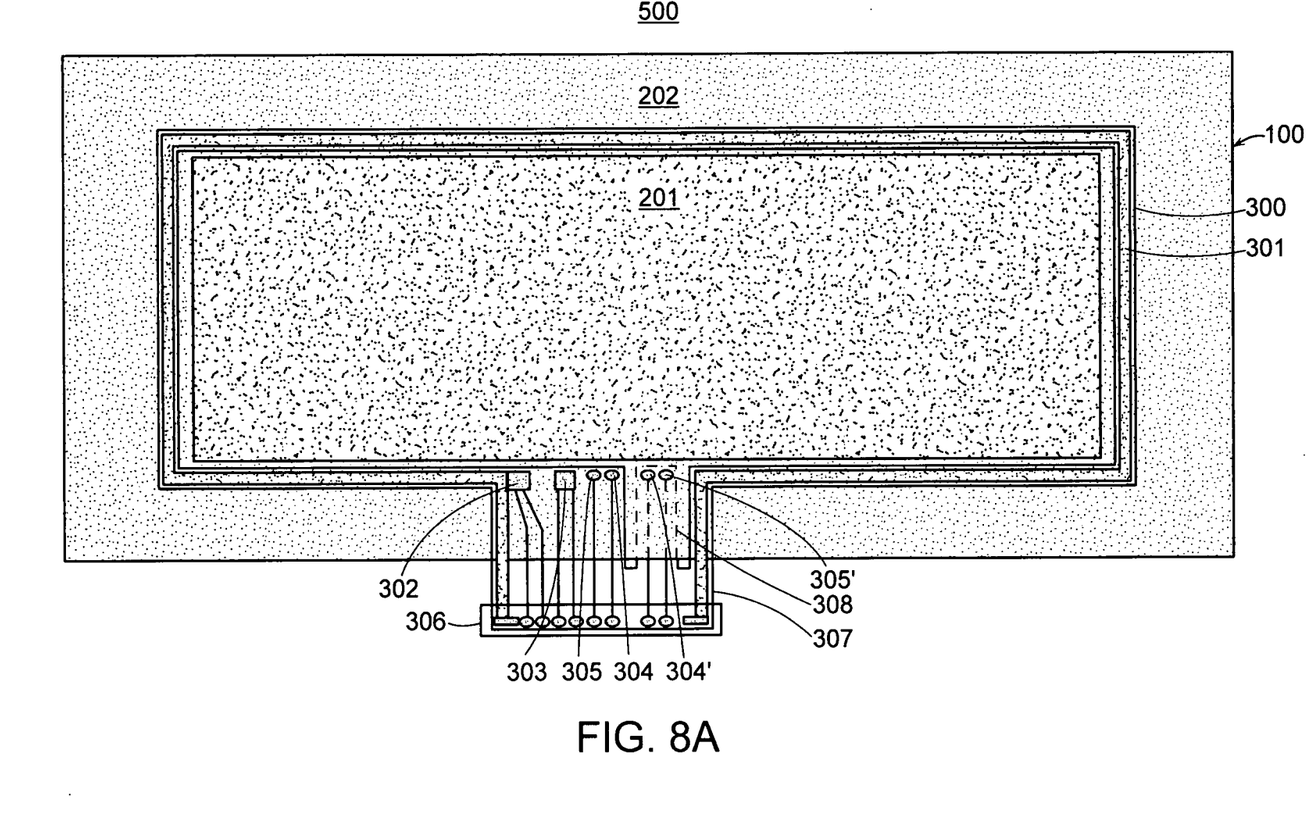
FIGS. 8A and 8B are a plan view and a cross-sectional view illustrating a PCB terminal formed on the flexible PCB in accordance with another embodiment of the present invention.
Figure 8B:
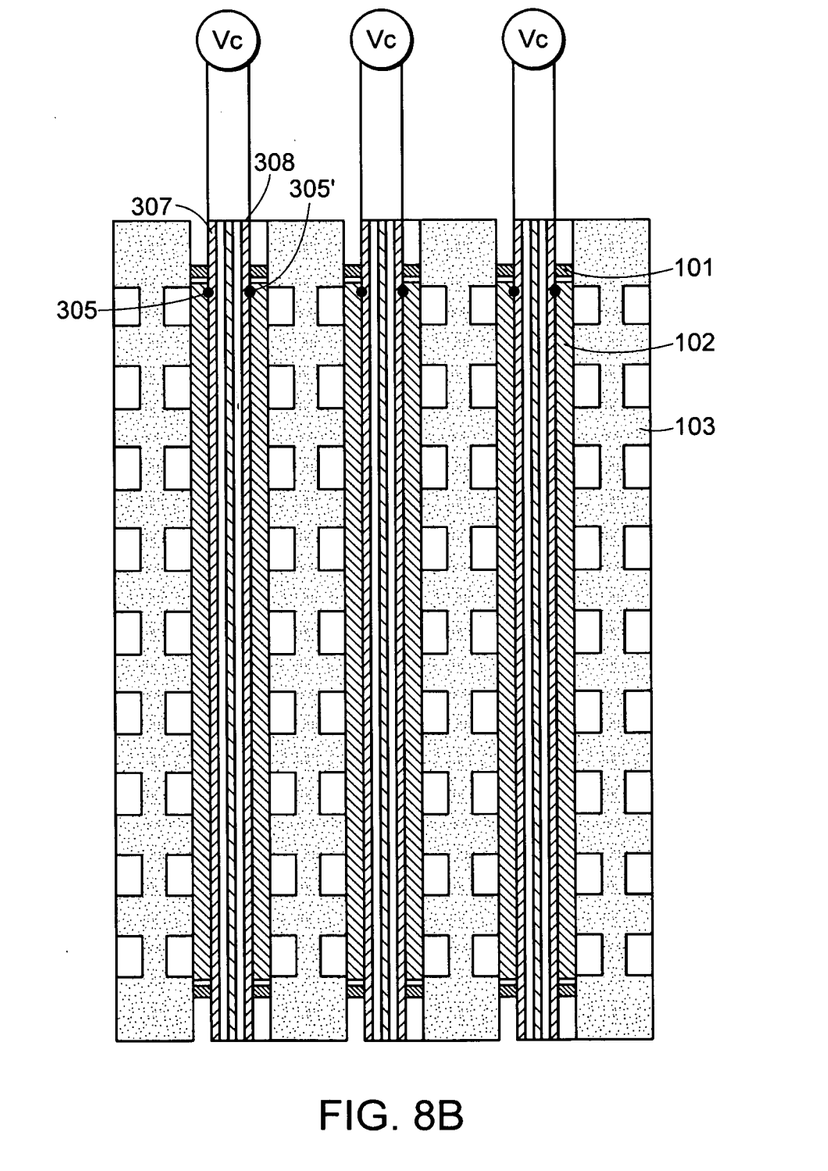

FIGS. 8A and 8B are a plan view and a cross-sectional view illustrating a PCB terminal formed on the flexible PCB in accordance with another embodiment of the present invention.

As described above, the PCB terminal 306 connected to communicate with the external controller 600 by the connector is formed on the lower end of the extension portion 307 of the polymer insulating film 300. Moreover, the electrical contact 304 for measuring the resistance of the unit cells, and the electrical contact 305 for measuring the voltage of the unit cells are formed in a predetermined arrangement to communicate with the PCB terminal 306.

As another embodiment, a branch terminal 308 is formed in the extension portion 307 such that the extension portion 307 is positioned on one surface of the MEA 100 and the branch terminal 308 is positioned on the opposite surface of the MEA 100.

An electrical contact 304' for measuring the resistance of the unit cells and an electrical contact 305' for measuring the voltage of the unit cells are formed in the branch terminal 308 to communicate with the PCB terminal 306.

Accordingly, it is possible to facilitate the measurement of voltage and resistance by measuring the voltage directly from both sides of the MEA 100, excluding the resistance component of the separator.

A further embodiment of the PCB terminal formed on the flexible PCB of the present invention will be described below.

Figure 9:
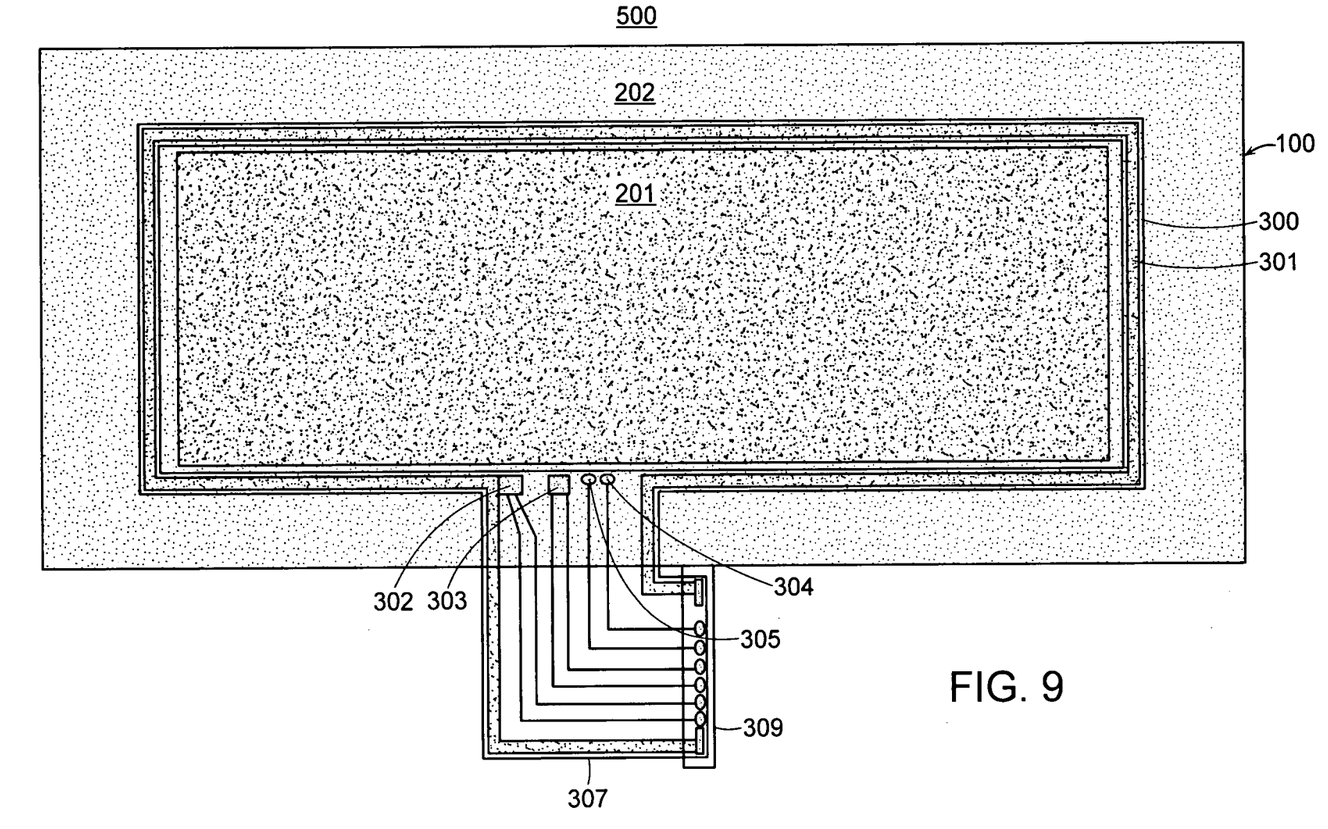
FIG. 9 is a plan view illustrating a PCB terminal formed on the flexible PCB in accordance with a further embodiment of the present invention.

FIG. 9 is a plan view illustrating a PCB terminal formed on the flexible PCB in accordance with a further embodiment of the present invention.

The present embodiment is characterized in that a PCB terminal 309 of the flexible PCB 400 shown in FIG. 9 is formed at a position rotated 90 degrees, i.e., on the side end of the extension portion 307, not on the lower end thereof.

In more detail, the PCB terminal 309 of the flexible PCB 400 is a side-mounted PCB terminal 309 to which the connector from the external controller 600 can be slidably mounted.

Accordingly, in a case where the terminals are vertically connected in the fuel cell stack in which a large number of unit cells are connected in series at small intervals, there is a difficulty in inserting the respective terminals into the connector. However, the side-mounted PCB terminal 309 shown in FIG. 9 provides an advantage in that it is easy to insert the terminals connected in series into the connector.

Figure 10A:
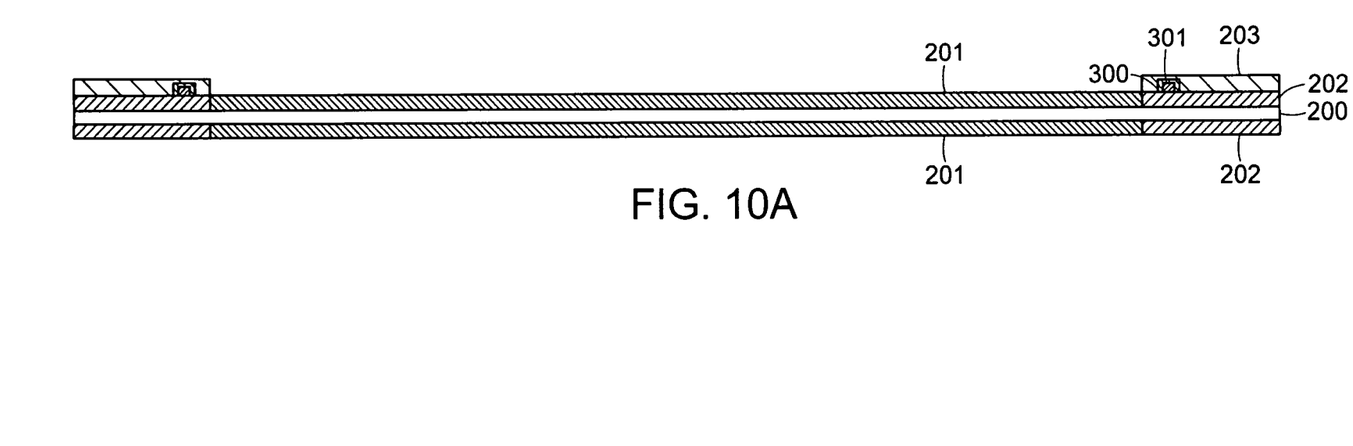
FIG. 10 is cross-sectional views illustrating the flexible PCB fixed on an ion exchange membrane support film of the MEA by a flexible PCB fixing film in accordance with the present invention.
Figure 10B:
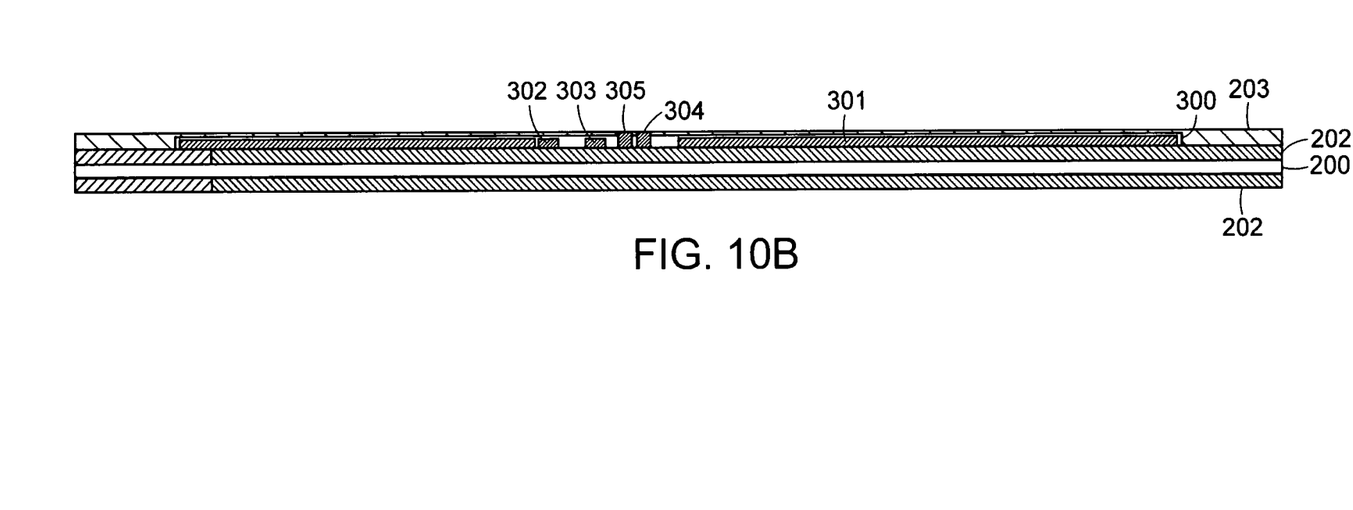

As shown in FIG. 10, as a preferred method of fixing the flexible PCB 400 of the present invention directly to the MBA 100, the flexible PCB 400 is mounted on the ion exchange membrane support film 202 of the MEA 100. If it is not feasible to combine the flexible PCB 400 and the ion exchange membrane support film 202, the flexible PCB 400 may be fixed to the MEA 100 using a flexible PCB fixing film 203 capable of being compressed with the ion exchange membrane support film 202.

That is, the flexible PCB fixing film 203 is provided on the surface of the ion exchange membrane support film 202 so as to cover the flexible PCB 400 and thus it is possible to reinforce the bonding force between the flexible PCB 400 and the ion exchange membrane support film 202 of the MEA 100.

As described above, according to the intelligent MEA for fuel cell in accordance with the present invention, it is possible to easily measure the voltage of the unit cells constituting the fuel cell stack and the resistance and temperature of the MEA by mounting the flexible PCB, in which the electrical heating element, the temperature sensors, and the electrical contacts for measuring the resistance and voltage of the unit cells are integrated, on the MEA.

Moreover, since the current amount supplied to the electrical heating element can be controlled by the external controller 600 according to a difference in temperatures detected by the electrical heating element temperature sensor and the MEA temperature sensor, it is possible to reduce the amount of the heat insulating material used to protect the fuel cell stack from the external low-temperature heat source and prevent heat transfer from the outside low-temperature heat source to the catalyst layer of the MEA during operation of the fuel cell stack at low temperature.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A membrane electrode assembly (MEA) for fuel cell, comprising:

an MEA in which a catalyst layer is coated on both sides of an ion exchange membrane, and an ion exchange membrane support film is attached on both sides of an edge portion of the ion exchange membrane;

a flexible printed circuit board (PCB) integrally formed on one surface of the ion exchange membrane support film which frames an outer perimeter of the catalyst layer of the MEA;

a PCB terminal formed on one end of the flexible PCB; and a connector connected to the PCB terminal to communicate with an external controller, wherein the flexible PCB includes an electrical heating element, an electrical heating element temperature sensor for measuring the temperature of the electrical heating element, an MEA temperature sensor for measuring the temperature of the MEA, an electrical contact for measuring the resistance of unit cells, and an electrical contact for measuring the voltage of the unit cells, formed in an arrangement to communicate with the PCB terminal.

2. The MEA for fuel cell of claim 1, wherein the electrical heating element is electrically connected to the PCB terminal and attached to the flexible PCB along a rectangular frame line of the flexible PCB and an outer line of an extension portion.

3. The MEA for fuel cell of claim 1, wherein the electrical heating element temperature sensor, the MEA temperature sensor, the electrical contact for measuring the resistance of the unit cells, and the electrical contact for measuring the voltage of the unit cells are formed in a row at a position where an extension portion of the flexible PCB starts to extend from a rectangular frame line.

4. The MEA for fuel cell of claim 1, wherein a branch terminal including a second electrical contact for measuring the resistance of the unit cells and a second electrical contact for measuring the voltage of the unit cells is integrally formed such that an extension portion is positioned on one surface of the MEA and the branch terminal is positioned on a surface of the MEA opposing the one surface on which the extension portion is formed.

5. The MEA for fuel cell of claim 1, wherein the PCB terminal is formed at a position rotated 90 degrees on the side end of an extension portion of the flexible PCB, not on the lower end thereof, such that the connector is slidably connected thereto.

6. The MEA for fuel cell of claim 1, wherein a flexible PCB fixing film is provided on a surface of the ion exchange membrane support film to cover the flexible PCB to reinforce the bonding force between the flexible PCB and the ion exchange membrane support film of the MEA.

7. The MEA for fuel cell of claim 1, wherein the flexible PCB is formed of polymer insulating film of a polyimide material and includes a rectangular frame line attached along the outer line of the catalyst layer of the MEA and an extension portion extending outward from the rectangular frame line.

8. The MEA for fuel cell of claim 7, wherein the electrical heating element is electrically connected to the PCB terminal and attached to the flexible PCB along the rectangular frame line of the flexible PCB and the outer line of the extension portion.

9. The MEA for fuel cell of claim 7, wherein the electrical heating element temperature sensor, the MEA temperature sensor, the electrical contact for measuring the resistance of the unit cells, and the electrical contact for measuring the voltage of the unit cells are formed in a row at a position where the extension portion of the flexible PCB starts to extend from the rectangular frame line.

10. The MEA for fuel cell of claim 7, wherein a branch terminal including a second electrical contact for measuring the resistance of the unit cells and a second electrical contact for measuring the voltage of the unit cells is integrally formed such that the extension portion is positioned on one surface of the MEA and the branch terminal is positioned on a surface of the MEA opposing the one surface on which the extension portion is formed.

11. The MEA for fuel cell of claim 7, wherein the PCB terminal is formed at a position rotated 90 degrees on the side end of the extension portion of the flexible PCB, not on the lower end thereof, so that the connector is slidably connected thereto.

* * * * *

UNITED STATES PATENT AND TRADEMARK OFFICE
CERTIFICATE OF CORRECTION

| | | |
|---|---|---|
| PATENT NO. | : 8,445,152 B2 | Page 1 of 1 |
| APPLICATION NO. | : 11/986842 | |
| DATED | : May 21, 2013 | |
| INVENTOR(S) | : Sae Hoon Kim et al. | |

It is certified that error appears in the above-identified patent and that said Letters Patent is hereby corrected as shown below:

On the Title page, Item [75] second inventor name should read: -- Young-Hyun Lee --

Signed and Sealed this
First Day of October, 2013

Teresa Stanek Rea
*Deputy Director of the United States Patent and Trademark Office*